L. L. LUDWIG.
KITCHEN CABINET.
APPLICATION FILED SEPT. 25, 1920.
1,419,278.
Patented June 13, 1922.
2 SHEETS—SHEET 2.
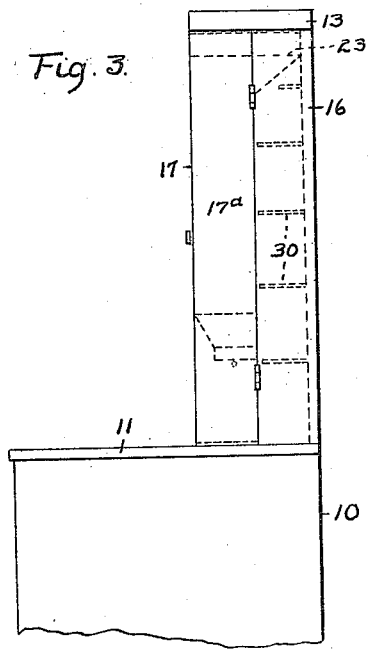
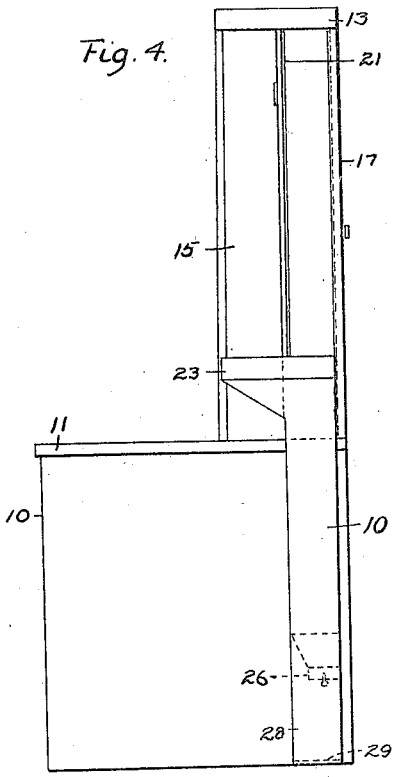
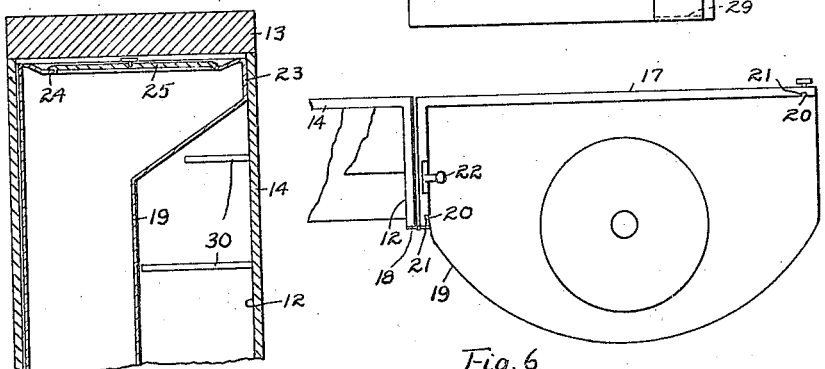
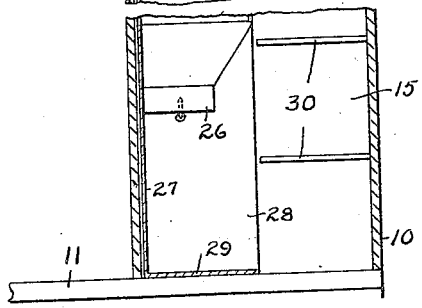
INVENTOR
Leonard L. Ludwig
ATTORNEY.

UNITED STATES PATENT OFFICE.

LEONARD L. LUDWIG, OF DELAVAN, KANSAS.

KITCHEN CABINET.

1,419,278.  Specification of Letters Patent.  Patented June 13, 1922.

Application filed September 25, 1920. Serial No. 412,721.

*To all whom it may concern:*

Be it known that I, LEONARD L. LUDWIG, a citizen of the United States, residing at Delavan, in the county of Morris and State of Kansas, have invented new and useful Improvements in Kitchen Cabinets, of which the following is a specification.

The invention relates to kitchen cabinets wherein compartments are provided for supporting various kitchen utensils, cooking ingredients and the like, including a flour bin. The object of the invention is to provide a novel cabinet in which the flour bin is so mounted and supported that it may be readily filled with a minimum of effort, the compartment containing the bin serving also to support various articles desirable in preparing food and the like.

The invention consists in a compartment provided with shelves, a door to close the compartment and a flour bin mounted on the door and slidable thereon in a vertical direction for filling and cleaning purposes.

Figure 1:
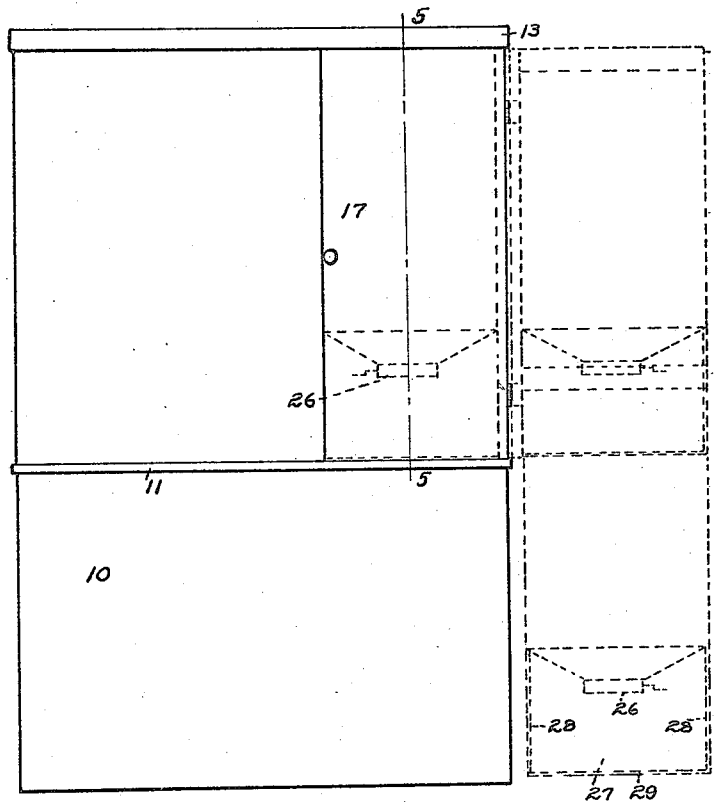
Figure 2:
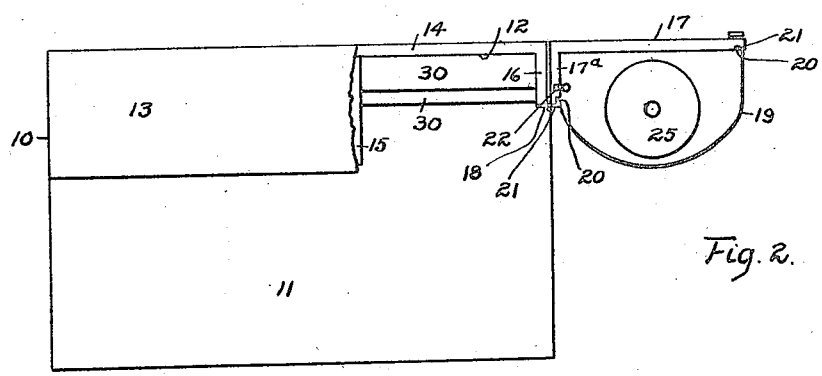

In the accompanying drawings I have illustrated an embodiment of the invention in which Figure 1 is a front elevational view of a cabinet provided with the invention; Fig. 2 a plan view of the same, the flour bin-carrying door being in open position; Fig. 3 an end view of the cabinet, the flour bin-carrying door being closed; Fig. 4 an end view of the same with the flour bin-carrying door open and the bin lowered for filling; Fig. 5 a vertical cross-section in enlarged scale on line 5—5 of Fig. 1 and Fig. 6 a fractional plan view in enlarged scale of the cabinet with the flour bin-carrying door in open position.

Referring to the drawings, 10 indicates the cabinet having the work table or shelf 11 with suitable compartments below the shelf arranged as desired and also suitable compartments arranged as desired above the shelf. One upper compartment 12 contains the flour bin and shelves with which the invention is concerned, hence further description of the remaining compartments is not necessary since they may be formed in any of the well known manners as may be desired.

Compartment 12 is formed at one end of the top portion of the cabinet by top member 13, back 14, partition 15, shelf 11 and end 16. End 16 is a fraction of the width of the upper portion of the cabinet and door 17 is hinged, as by hinges 18, to the front edge of end 16. Door 17 is L-shaped in horizontal cross-section, so that its shorter portion 17ª, when the door is closed, forms a portion of the end wall of the upper part of the cabinet. Flour bin 19 is carried by the door, and is vertically slidable thereon, cleats 20 on the bin being engaged in grooves 21 formed in the door which serve to guide the bin and also prevent its disengagement from the door. A catch or other suitable means 22 supports the bin on the door in elevated position. By releasing the catch or support the bin may be lowered on the door until its lower end reaches the floor upon which the cabinet may stand. This downward movement is possible only when the door is opened and when opened as shown in Fig. 1 in dotted outline, and in Figs. 2, 4 and 6, the portion 17ª of the door swings back against or closely approaches the end 16 of the cabinet. The flour bin is carried laterally of the cabinet so that the bin is now supported at the side of the cabinet and is clear of shelf 11.

The upper portion 23 of the bin is enlarged and a relatively large filling opening 24 is formed in the top and normally closed by a suitable cover 25. The large opening 24 affords easy filling of the bin when the bin is lowered. The bin is of such length that when lowered to its fullest extent its top or mouth is disposed at the side of the cabinet and conveniently near the floor so that a sack of flour may be readily lifted and emptied into the bin, thus avoiding the excessive effort required to fill bins heretofore in use in the usual kitchen cabinet.

A suitable sifter 26 is provided at the lower end of the bin and the back 27 and side walls 28 of the bin are extended downwardly below the sifter and joined by a shelf 29 upon which shelf a vessel to receive the flour from the bin may be placed. When the door is closed shelf 29 clears shelf 11 so that the bin is entirely within the compartment and invisible. To clean the bin it is only necessary to slide it up vertically on the door and remove it at the top of the door. The bin being of light construction is readily moved in the door when empty.

A series of shelves 30 are suitably secured to back 14, partition 15 and end 16, the upper partition being shallow to permit the enlarged mouth of the bin to pass over it. On these shelves various articles may be placed where they will be convenient for use when the door has been opened, but which, when the door is closed, will be invisible.

What I claim is:

1. In a kitchen cabinet, a compartment in the upper part and at one end of the cabinet, a door to close the compartment and adapted to swing laterally to one side of the cabinet and having a plurality of grooves in its inner face extending from top to bottom of the door, a flour bin having a discharge opening at its lower end and an expanded filling opening at its upper end, cleats on the wall of the bin slidably engaged in the grooves whereby the bin is vertically movable on the door for lowering the bin for filling and means on the bin cooperating with the door for supporting the bin in elevated position but detachable for lowering the bin.

2. In a kitchen cabinet, a compartment in the upper part and at one end of the cabinet, an L-shaped door to close the compartment, a portion of the door forming a portion of the side of compartment when closed, the door having a plurality of grooves in its inner face extending from top to bottom thereof, a bin having an expanded filling opening at its top and a discharge opening at its lower end, a plurality of cleats on the walls of the bin and slidably engaged in the grooves whereby the bin is vertically slidable on the door and parallel thereto for lowering the same for filling and means to releasably lock the bin in elevated position on the door.

In witness whereof I hereunto subscribe my name.

LEONARD L. LUDWIG.